Nov. 23, 1943.     D. G. MARLOW     2,334,880
APPARATUS FOR WINDING CORES
Filed Jan. 21, 1942     6 Sheets-Sheet 1

INVENTOR
DOUGLAS GEORGE MARLOW
BY
HARRIS, KIECH, FOSTER & HARRIS
FOR THE FIRM
ATTORNEYS.

Nov. 23, 1943. D. G. MARLOW 2,334,880
APPARATUS FOR WINDING CORES
Filed Jan. 21, 1942 6 Sheets-Sheet 4

INVENTOR
DOUGLAS GEORGE MARLOW
BY HARRIS, KIECH, FOSTER & HARRIS
FOR THE FIRM
ATTORNEYS.

Patented Nov. 23, 1943

2,334,880

UNITED STATES PATENT OFFICE 2,334,880

APPARATUS FOR WINDING CORES

Douglas George Marlow, Altadena, Calif., assignor to National Technical Laboratories, South Pasadena, Calif., a corporation of California Application January 21, 1942, Serial No. 427,581

23 Claims. (Cl. 57—6)

My invention relates to the winding of wire and the like with special reference to procedures for helically winding filaments on elongated cores, and is directed specifically to an improved apparatus and method for the quantity production of such a wound core. The term "filament" is herein used in a broad sense as including an element formed of a material capable of flexing sufficiently to be wound on a core, whether or not the material is electrically conducting.

While my invention is applicable broadly to winding problems in various arts, it is being initially employed for the fabrication of helically wound electrical resistance elements. I elect to describe my invention as so applied, since such a disclosure will be adequate guidance for employing the invention in other arts and for other purposes.

The general object of the invention is to provide a reliable and automatic high speed apparatus for helically winding a filament onto an elongated core.

The apparatus includes rotary means for moving the core longitudinally through a processing zone and a second rotary means for winding the filament onto the traveling core in the processing zone, and certain objects of the invention relate to these two rotary means. One of these objects is to provide automatic control for the relative speeds of the two rotary means to the end that the winding operation may be carried out with the filament fed to the periphery of the traveling core at a desirable angle.

For compact winding, the filament must not only be taut to a required degree but also must be fed to the traveling core at an angle that is slightly acute relative to the direction of core movement, the slightly acute angle being necessary to cause the filament in approaching the periphery of the core to crowd against the last laid turn of the filament. While the feed angle may vary within an appreciable range of angles, compactness in the winding of the filament is lost if the feed angle is too large, and, on the other hand, feeding the wire at too small an angle causes the filament to climb upon the previously laid turns.

One object of my invention is to provide automatic means to change either the speed of the winding operation or the speed of the core travel whenever the angle of feed approaches one of the limits of the range of desirable feed angles thereby to avoid departures from that range. In the preferred form of my invention I vary the speed of the core travel in response to variation of the angle of winding feed.

A further object sought in the preferred form of the invention is to provide automatic means to stop both of said rotary means, thereby to stop both the winding operation and the travel of the core whenever the filament being fed to the core departs from the above-mentioned range of angles or whenever the filament breaks.

Certain objects of my invention relate to the specific problem of controlling one of the two rotary means in response to variation in the angle of winding-feed. Among these objects in various practices of my invention are: to provide a suitably sensitive control member responsive to the angle of winding-feed; to provide control circuits adequately responsive to said control member; to provide in the control arrangement an adjustable motor circuit, in which circuit the adjustment is shifted automatically whenever the winding-feed angle approaches one of the limits of the selective range of angles; to provide in the control arrangement a motor circuit in which approach of the winding-feed angle to a limit not only results in a shift of the aforesaid adjustment, but also results in temporary corrective changes; to provide a main motor for both said rotary means with the driving transmission to one of the rotary means adjustable in response to changes in the winding-feed angle; and to provide a main motor for directly driving one of the two rotary means together with an automatically adjustable auxiliary or differential motor cooperative with the main motor to drive the other of the two rotary means.

Another group of objects relates to the problem of producing a particular type of electrical resistance element comprising an insulation-coated resistive conductor helically wound on a helical core. These objects include: to provide means having the dual function of forming the core to helical configuration and of drawing the unformed core through a processing zone; to provide a means and method for bonding the helical element to the core; to provide a means and method for winding a core compactly to a predetermined maximum cross-sectional configuration; and to provide a means and method for removing a portion of the coating from the coated winding to provide an exposed path along the finished resistance element.

The above and other objects of my invention will be apparent in my more detailed description to follow, taken with the accompanying drawings.

In the drawings, which are to be taken as illustrative only.

General arrangement

Figure 19:
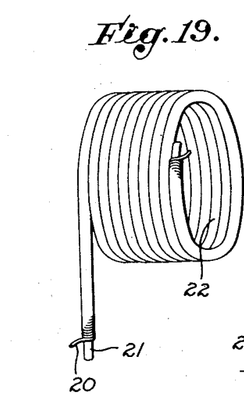
Fig. 19 is a perspective view of an electrical resistance element produced by the preferred form of my apparatus.

The purpose of the specific apparatus shown in the drawings is to produce in quantity electrical resistance elements of the type disclosed in the copending application Serial No. 399,300, filed June 23, 1941, by Henry H. Cary and Douglas George Marlow, entitled "Variable resistor." Such a resistance element, shown here in Fig. 19, comprises an insulated resistive conductor 20 helically wound on a core 21, the core 21 being preferably a relatively heavy wire formed to helical configuration. The resulting unit is wound helically to form the resistance element shown in Fig. 19. The insulating coating of the resistive conductor 20 is removed to expose the metal of the resistive conductor along a helical contact path 22 on the inside or outside of the completed resistance element, the purpose of the path being to permit a movable contact (not shown) to make electrical contact with the conductor 20.

Figure 1:
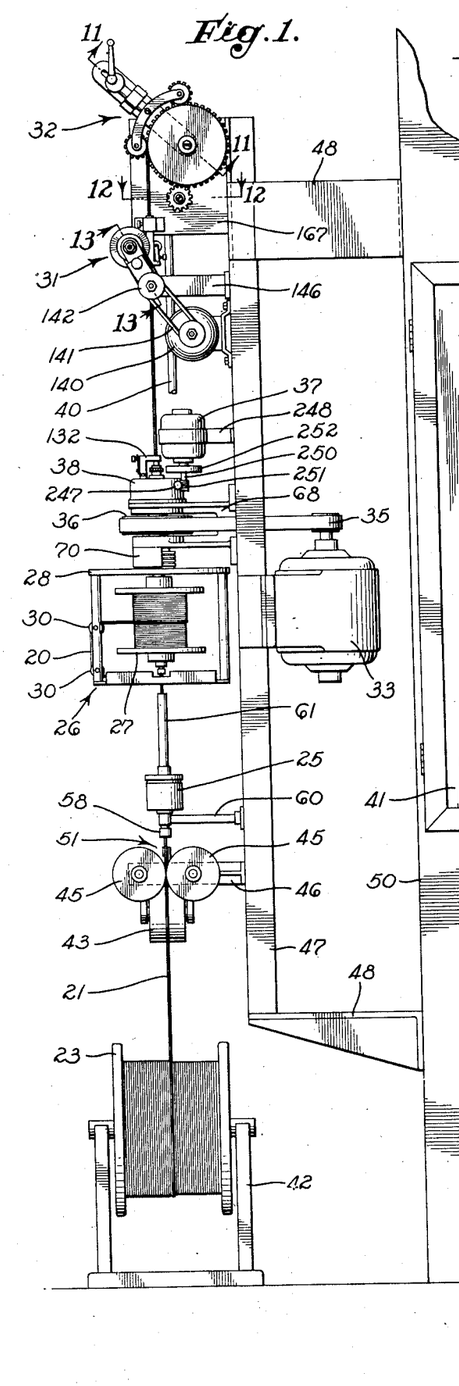
Fig. 1 is a side elevation of the preferred form of my apparatus.
Figure 2:
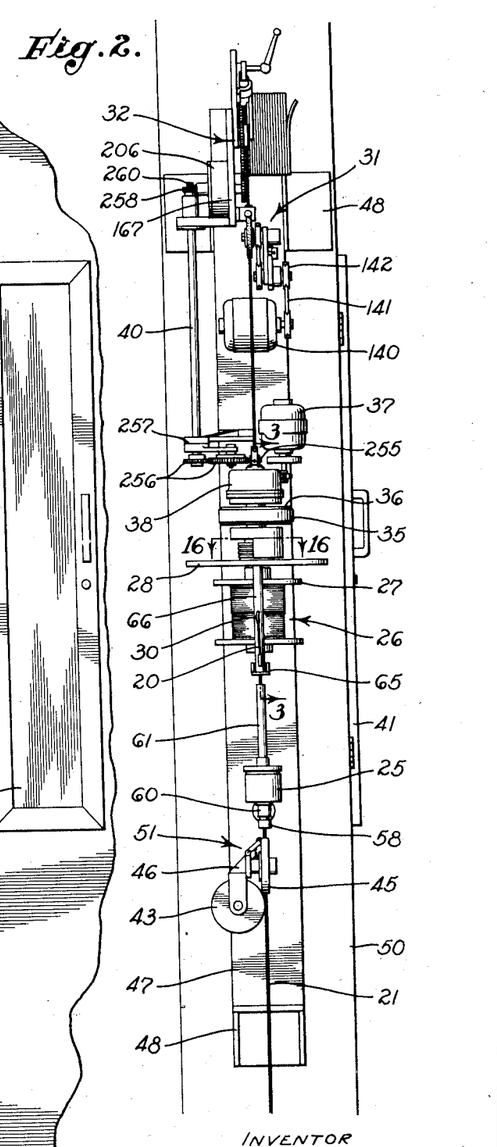
Fig. 2 is a front elevation of the apparatus.

The principal elements of the apparatus shown in Figs. 1 and 2 include a spool 23 for supplying the core 21, a receptacle 25 for coating the core with shellac or other adhesive material, and a winding mechanism generally designated by the numeral 26 that winds the insulated conductor 20 on the core 21, preferably while the shellac on the core is still tacky. The winding mechanism 26 includes a spool 27, a winding frame 28, and two feed pulleys 30 in the frame for leading the insulated conductor 20 to a winding station in the lower end of the frame. After the core 21 is wound with the conductor 20, the previously mentioned contact path 22 is produced by leading the wound core against a coating-removal mechanism generally designated by the numeral 31. Finally, the core carrying the helical winding is engaged by a forming mechanism generally designated 32 which has the function not only of forming the core into a helix but also of causing the core to move longitudinally through the apparatus.

A main motor 33 drives the winding mechanism 26 through a drive belt 35 and a sheave 36 and also drives the forming mechanism 32 in cooperation with a differential motor 37, the power transmission to the forming mechanism including differential gearing in a gear case 38 and a vertical shaft 40. Control of the relation between the rate at which the insulated conductor 20 is wound on the core 21 and the rate of longitudinal movement of the core is governed by the rate of rotation of the differential motor 37, since the speed of the forming mechanism 32 is the resultant of the speed of the main motor and of the speed of the differential motor. The means for regulating the speed of the differential motor 37 includes control means responsive to changes in the angle of feed of the conductor 20 to the core 21 and includes associated electrical devices in a control cabinet 41.

The core coating means

From the spool 23, which is rotatably carried by a pair of standards 42, the core 21 is led upward across the periphery of a relatively broad guide roller 43 and between a pair of grooved guide rollers 45. The guide rollers 43 and 45 are carried by a bracket 46 which in turn is mounted on a vertical frame 47. The vertical frame 47, on which various mechanisms of the apparatus are mounted, may comprise simply a vertical channel-iron carried by two brackets 48, the brackets being mounted on a building wall or column 50.

Figure 10:
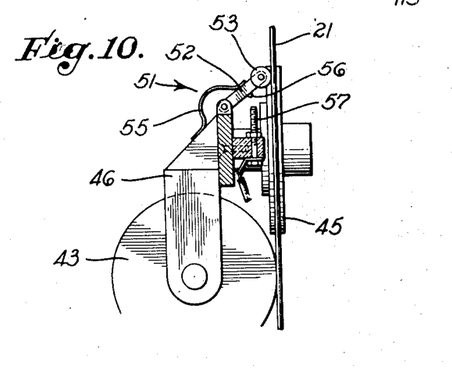
Fig. 10 is an enlarged side elevation partly in section of an emergency stop switch included in the apparatus.

A switch generally designated 51 for automatically stopping the apparatus whenever the core 21 breaks or runs out may be placed near the guide rollers 43 and 45 and may be constructed as best shown in Fig. 10. The switch 51 includes an arm 52 pivotally mounted on the bracket 46 to swing against the traveling core 21, the arm carrying a roller 53 in contact with the core. The arm 52 is urged laterally downward by a suitable leaf-spring 55 but is normally held against such movement by the traveling core. When the core 21 breaks or runs out, the arm 52 is released to carry a contact 56 on the arm against a stationary contact 57, thereby closing a stop circuit.

From the guide rollers 43 and 45 the core is led through a packing gland 58 in the bottom of the previously mentioned receptacle 25 that contains the shellac for coating the core. The receptacle 25 is supported on a standard 60 that extends outwardly from the apparatus frame 47 and the receptacle is provided with a cover having a vertical tubular extension 61 through which the wire leaves the receptacle, the purpose of the extension being to retard drying of the shellac on the core 21 until the latter reaches the winding position. From the tubular extension 61 the core 21 is led to the winding mechanism 26.

The winding mechanism

Figure 3:
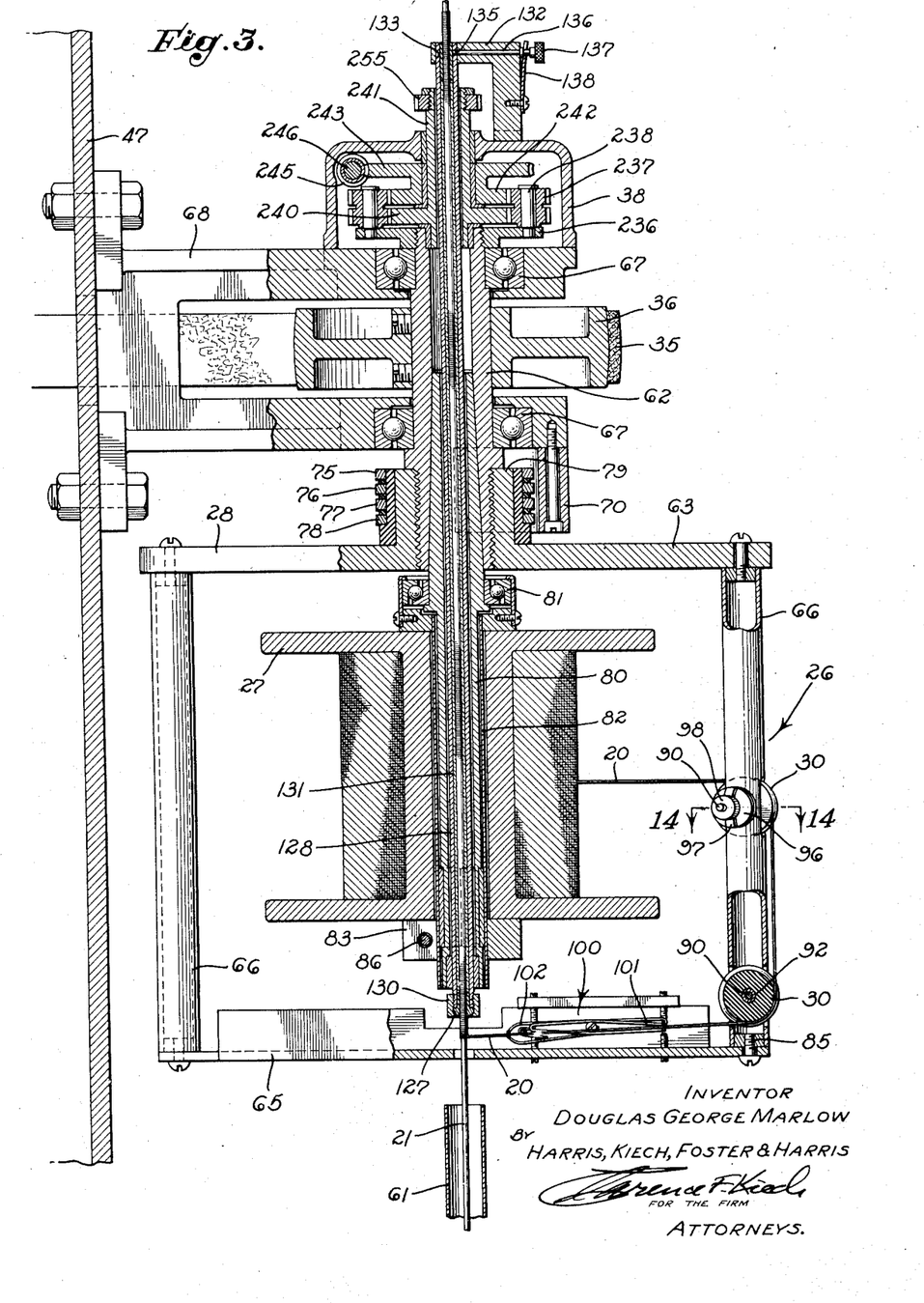
Fig. 3 is a vertical section on an enlarged scale taken as indicated by the line 3—3 of Fig. 2.
Figures 4, 5:
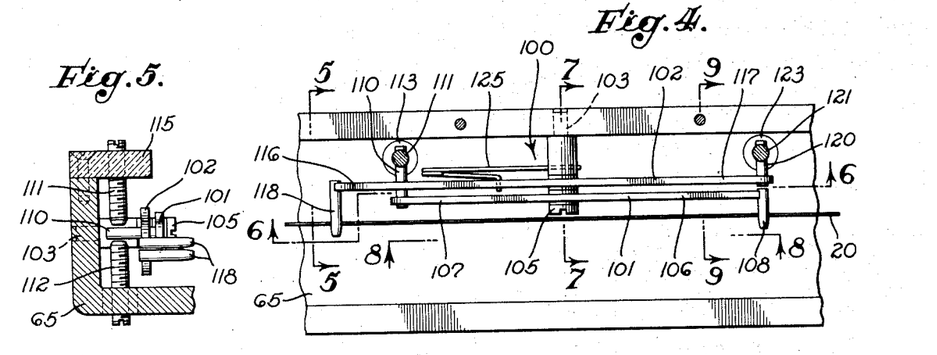
Fig. 4 is a fragmentary plan view partly in section showing a control assembly responsive to the winding-feed angle of the filament.
Fig. 5 is a transverse section taken as indicated by the line 5—5 of Fig. 4.
Figures 6, 7:
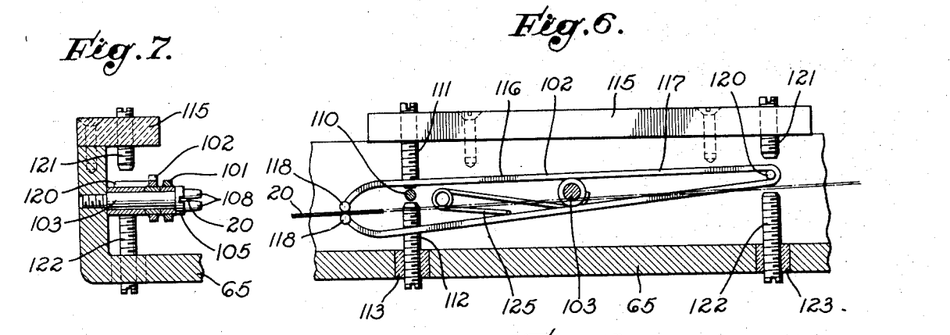
Fig. 6 is a longitudinal section taken on the broken line 6—6 of Fig. 4.
Fig. 7 is a transverse section taken as indicated by the line 7—7 of Fig. 4.
Figure 8:
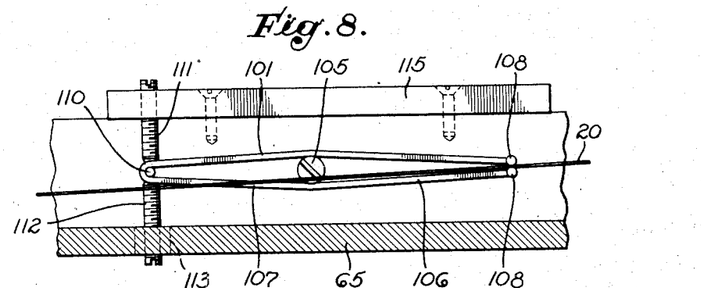
Fig. 8 is a longitudinal section taken as indicated by the line 8—8 of Fig. 4.
Figure 9:
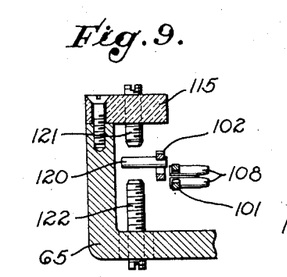
Fig. 9 is a transverse section taken as indicated by the line 9—9 of Fig. 4.

As best shown in Fig. 3 the winding frame 28 of the winding mechanism 26 is fixed to the lower end of a tubular stub shaft 62 and comprises an upper cross-bar 63, a lower channel-shaped cross-bar 65, and a pair of vertical tubular members 66 interconnecting the two cross-bars. The tubular shaft 62, which carries the previously mentioned drive sheave 36, is rotatably supported by a pair of ball-bearings 67 that are mounted in a horizontal bracket 68, the bracket being anchored to the vertical apparatus frame 47. Depending from the bracket 68 is an arcuate support 70 for four brush assemblies (Fig. 16) 71, 72, 73, and 74 that electrically cooperate respectively with four spaced rings (Fig. 3) 75, 76, 77, and 78 carried by a collar 79 on the rotary winding frame 28. The function of these brushes and rings will be explained later.

To support the previously mentioned spool 27 inside the rotary winding frame 28, a tubular spindle 80 is fitted into the hollow stub shaft 62. Rotatably supported by a ball-bearing 81 on the spindle 80 is a spool sleeve 82, at the lower end of which is a spool-supporting split collar 83. To change a spool 27, the operator loosens a screw 85 to swing the lower cross-bar 65 to one side and then loosens a setscrew 86 to remove the split collar 83 from the spool sleeve.

From the spool 27 the insulated conductor 20, which is preferably enamel-covered resistance wire, is led laterally outward to the pair of grooved feed pulleys 30, mounted in one of the tubular members 66 of the winding frame 28. Each of the two grooved feed pulleys 30 is constructed and mounted in the manner indicated by Figs. 3, 14, and 15. Each pulley 30 is rotatably carried by a small spindle 90, the spindle having screw threads 91 engaging the tubular frame member 66. Extending laterally from the pulley 30 to rotate therewith on the spindle 90 is an extension 92 terminating in a disc 93, the disc being provided with a facing 95 of leather or other suitable material. Pressing against the facing 95 to serve as a brake on a rotation of the pulley 30 is a second disc 96 keyed to the spindle 90, the pressure being provided by a bowed leaf-spring 97 backed by an adjustable nut 98 on the end of the spindle 90. The described adjustable brakes to retard the two feed pulleys are provided for the purpose of placing the insulated conductor 20 under a desirable degree of tension as the insulated conductor is fed to the periphery of the core 21.

As the insulated conductor 20 leaves the lower pulley 30 to approach the traveling core 21, it passes through a small control assembly generally designated 100 in Fig. 3. As shown in Figs. 4 to 8, the control assembly 100 includes a normal control lever 101 and an emergency control lever 102 both retained on a stud 103 capped by a screw 105, the stud being mounted in the channel-shaped cross-bar 65 of the winding frame. The normal control lever 101, shown in plan in Fig. 4 and in side elevation in Fig. 8, may comprise a loop of stiff wire forming a response arm 106 and a switch arm 107. The response arm 106 carries at its end a pair of spaced laterally extending fingers 108 that slidingly engage opposite sides of the insulated conductor 20 as the conductor approaches the traveling core 21 at the winding station. The switch arm 107, which is on the grounded side of a circuit, carries at its end a laterally extending contact 110 in the path of which is an upper stationary contact 111 and a lower stationary contact 112. For insulation from the winding frame the lower contact 112 is mounted in an insulating bushing 113 and the upper contact 111 is mounted in a plate 115 of insulating material.

If the rate of travel of the core 21 through the winding station is excessive relative to the rate at which the conductor 20 is wound onto the core, the feed angle of the insulated conductor relative to the core will decrease and the moving contact 110 will touch the lower stationary contact 112 to close a control circuit for reducing the speed of core travel. On the other hand, if the rate of core travel lags relative to the winding rate, the winding-feed angle will increase and the movable contact 110 will touch the upper stationary contact 111 to close a control circuit having the function of accelerating the core. Both of the stationary contacts 111 and 112 are threaded for axial adjustment whereby the range of angles in which the switch arm 107 is operative may be varied at will. It will be noted in Fig. 6 that the two stationary contacts are relatively close together, so that the two control circuits become effective in a relatively narrow range of feed angles.

The emergency control lever 102 is constructed and arranged in substantially the same manner as the above described normal control lever and in the same manner provides a response arm 116 and a switch arm 117, but the arms of the emergency control lever are disposed oppositely from the arms of the normal control lever. The response arm 116 of the emergency control lever has two spaced fingers 118 for sliding engagement with the insulated conductor 20 and the switch arm 117 swings a contact 120 between an upper stationary adjustable contact 121 in the insulating plate 115 and a lower stationary adjustable contact 122 in an insulating bushing 123. The emergency control lever 102 has the function of stopping the apparatus whenever the winding-feed angle exceeds a predetermined range and also has the function of stopping operation whenever the insulated conductor 20 is broken or runs out. The two stationary contacts 121 and 122 are therefore connected to suitable relays for stopping operation whenever the emergency control lever 102 reaches a limit position and a suitable spring 125 is provided to urge the emergency control lever to one of its limit positions whenever the conductor breaks or runs out and thereby releases the control lever.

In the described arrangement the two stationary contacts 121 and 122 for stopping the apparatus are adjusted to permit a range of feed angles exceeding in both directions the range of feed angles within which the normal control lever 101 operates. Consequently the switch arm 117 of the emergency control lever takes an effective position only when the action of the normal control lever 101 fails to keep the winding-feed angle within operative bounds.

In the preferred form of my apparatus, as soon as the wound core leaves the winding station and before the shellac coating hardens, the core is drawn through an orifice member designed and dimensioned to remove foreign material or any exuded shellac. The orifice member may be designed for the further purpose of insuring that the finished product is uniformly within a predetermined maximum gauge in cross-sectional dimension. In the particular construction illustrated, a replaceable orifice member 127 is retained on the end of a metal tube 128 by a suitable bushing 130. The metal tube 128, which has a tubular glass lining 131, is held fixedly along the axis of the winding frame 28 by a fixed arm 132 on the previously mentioned gear case 38. To permit removal of the metal tube 128 whenever desired, the metal tube fits slidingly into a bore 133 in the end of the arm 132 and is provided with a peripheral recess 135 for engagement by a transverse latch pin 136. The latch pin 136 is provided with a head 137 for manual manipulation and is releasably held in effective disposition of a leaf-spring 138.

The coating-removal mechanism

The scraper means shown in Figs. 1, 2, 13, and 17 is driven by a motor 140 mounted on the apparatus frame 47. The motor 140 through a belt 141 drives a small sheave 142 keyed to a small countershaft 143, the countershaft being journaled in bearings 145 on the end of a standard 146. The countershaft 143 is keyed to a second sheave 147 that operates a belt 148 to drive a third sheave 150. The third sheave 150 is keyed to a second countershaft 151 that is journaled in bearings 152 on the end of an arm 153, the function of the countershaft 151 being to drive a rotary abrading means 155. In the depicted construction the abrading means 155 is a wire brush but various scraping devices may be employed in various practices of the invention. The arm 153 that carries the rotary brush 155 is rotatably mounted on a cylindrical portion 156 of the standard 146 in such manner that the arm is free to swing about the axis of the first countershaft 143, it being contemplated that the abrading brush 155 may be applied to either of the two opposite sides of the wound traveling core.

In my preferred arrangement suitable means is provided for accurately adjusting the angle of the arm 153 to position the rotary brush 155 accurately relative to the wound core. For the purpose of such adjustment I provide an adjustment arm 157 having a split lower end 158 embracing the cylindrical portion 156 of the standard 146, the split end of the arm being provided with a screw 160 that may be loosened to permit the adjustment arm 157 to swing and which may be tightened to hold the arm at selected positions. The outer end of the adjustment arm 157 is cut away to form two fingers 161 that are in snug contact with opposite sides of an eccentric or adjustment cam 162. The eccentric 162 has a suitable adjustment knob 163 for manual manipulation and is journaled in a bore 165 in the swingable scraper arm 153, the eccentric being retained by a suitable screw 166. Approximate adjustment of the rotary brush 155 relative to the wound core 21 is obtained by adjustment of the adjustment arm 157 and then closer adjustment is obtained by carefully rotating the eccentric 162 to cause slight movement of the arm 153 relative to the fixed adjustment arm 157.

For accurate processing it is desirable to restrain the traveling wound core against lateral movement at the zone of scraper action. Above the standard 146 a vertical plate 167 extends outward from the apparatus frame 47 to support the previously mentioned forming mechanism 32. Mounted on the vertical plate 167 is a horizontal standard 168 having a cylindrical portion 170 at its outer end into which slidingly extends a guide tube 171 for the wound core. The guide tube 171 is releasably retained by a thumb screw 172, and two diametrically opposite recesses 173 are provided for engagement by the thumb screw whereby the guide tube may be set in either of two diametrically opposite dispositions. To expose the traveling wound core to the abrading action of the brush 155, an extensive recess 175 is cut in one side of the guide tube 171, and a longitudinal slot 176 is cut on the opposite side of the guide tube to permit a thin roller 177 to press against the wound core.

In the construction shown, the roller 177 is mounted in a slot 178 on the end of a small arm 180, and the arm is pivotally mounted on a small bracket 181 at the lower end of the guide tube. The arm 180 is yieldingly urged toward the axis of the guide tube by a suitable coiled spring 182 on a stud 183. The stud 183, which is mounted on the guide tube 171, extends through an aperture 185 in the arm 180 and carries a thumb nut 186 for manual adjustment of the spring pressure.

In the disposition of the scraper mechanism depicted in the drawings the insulation is removed from the wound core to provide a path of exposed metal on the outside of the finished product. If it is required that the path of exposed metal lie inside the finished helix, the arm 153 is rotated about the countershaft 143 to the opposite side of the guide tube 171, and the guide tube is rotated 180° to a reverse position.

The final forming mechanism

Figures 11, 12, 13, 14, 15, 16:
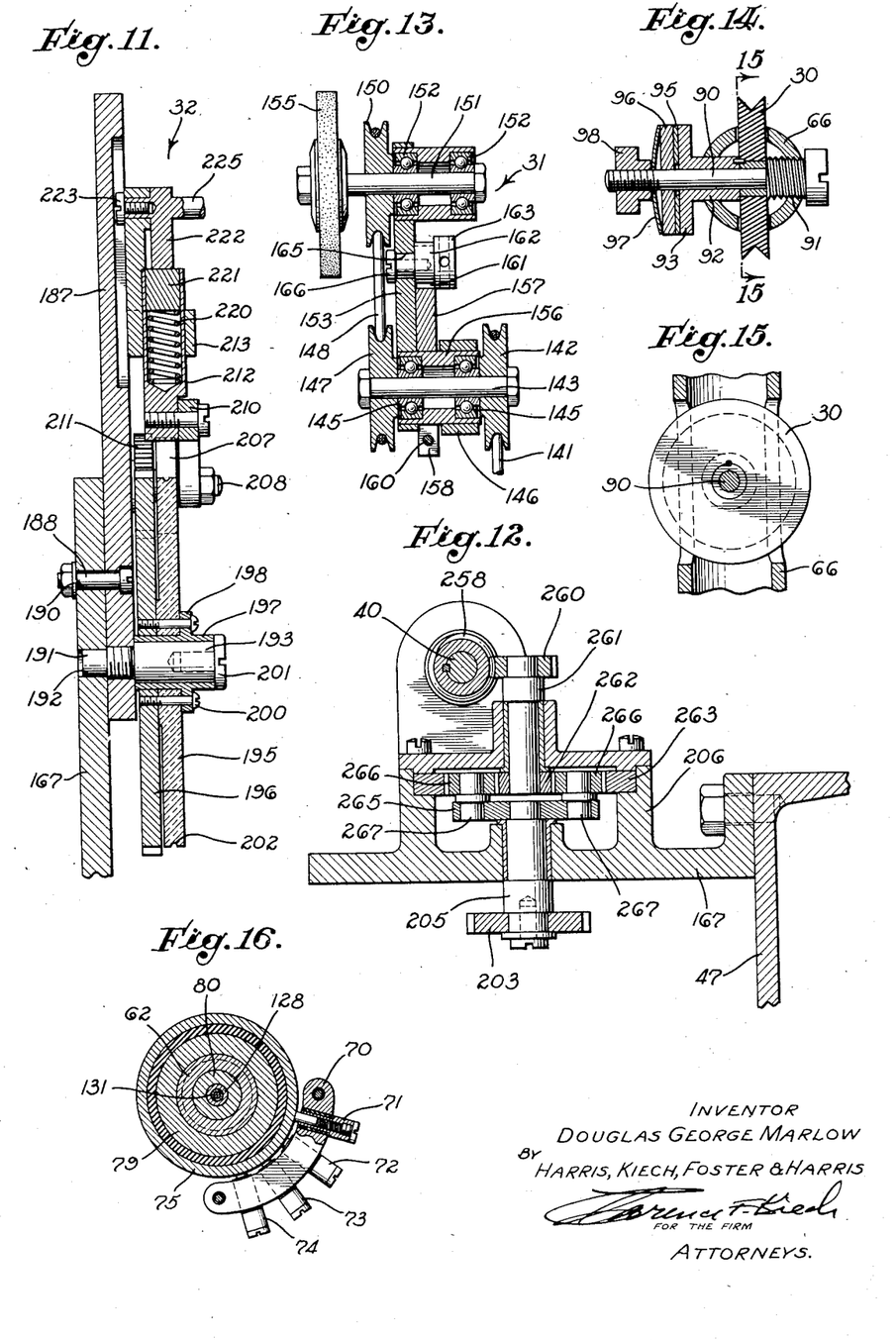
Fig. 11 is an enlarged section through a portion of the apparatus taken as indicated by the line 11—11 of Fig. 1, or the line 11—11 of Fig. 17.
Fig. 12 is an enlarged horizontal section taken as indicated by the line 12—12 of Fig. 1.
Fig. 13 is an enlarged section taken as indicated by the line 13—13 of Fig. 1.
Fig. 14 is an enlarged section taken as indicated by the line 14—14 of Fig. 3.
Fig. 15 is a section taken as indicated by the line 15—15 of Fig. 14.
Fig. 16 is an enlarged horizontal section taken as indicated by the line 16—16 of Fig. 2.
Figures 17, 18:
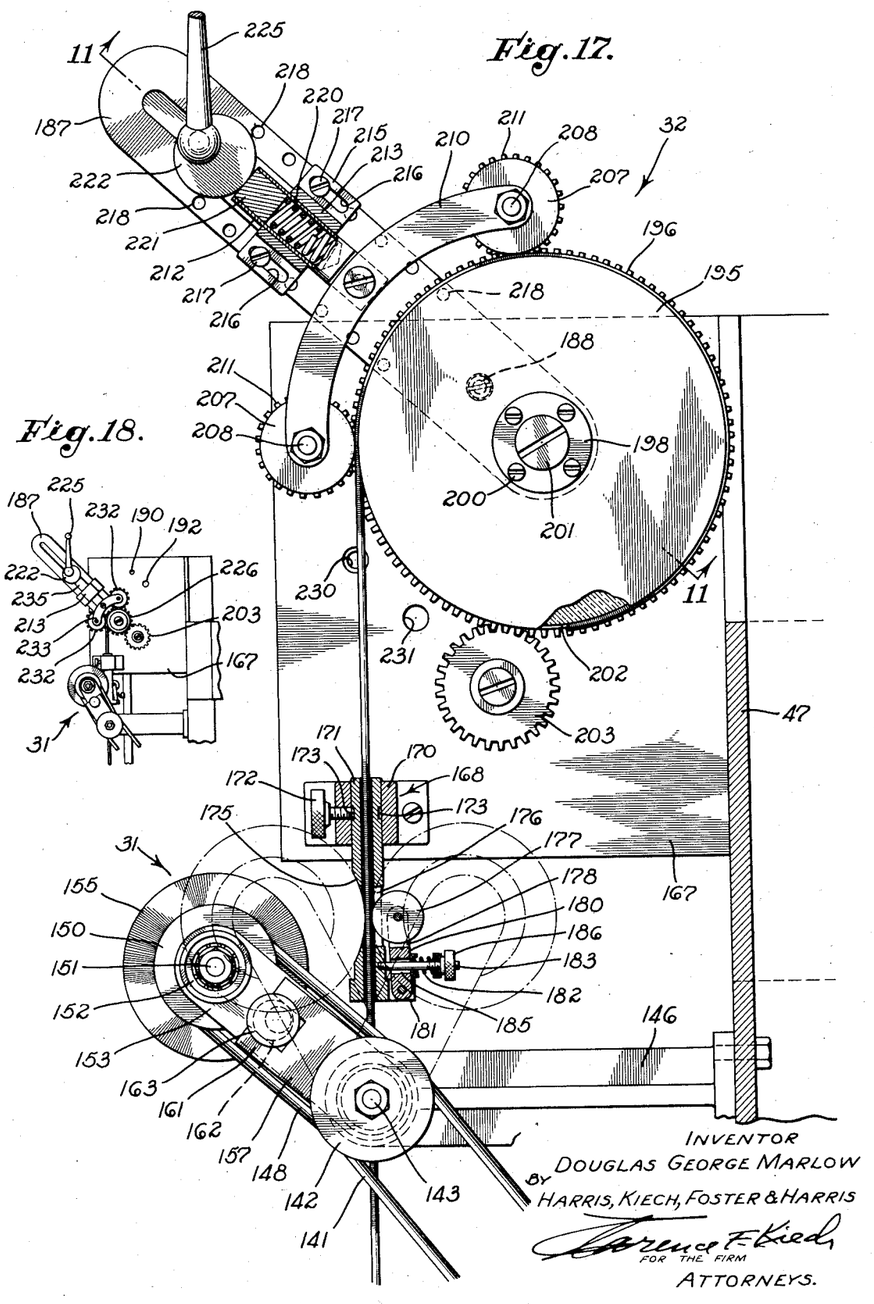
Fig. 17 is an enlarged portion of Fig. 1 with certain parts shown in section.
Fig. 18 is a view similar to Fig. 17 on a reduced scale showing a modified gear arrangement.

The forming mechanism 32 which is best shown in Figs. 11, 12, and 17 includes an arm 187 that is removably mounted on the upper end of the vertical plate 167 in some suitable manner. For example, the arm may be releasably attached to the plate 167 by a bolt 188 extending through a bore 190 in the plate and may be held against rotation about the axis of the bolt by a projection 191 seated in a second bore 192 in the plate. In the construction shown, the projection 191 is provided by the inner end of a stud 193 that is mounted on the arm 187 to rotatably carry a relatively thin forming roll 195 and an associated gear 196 of substantially the same diameter. Both the forming roll 195 and the gear 196 are mounted on a hub member 197 having a flange 198 and are connected with the hub flange by suitable screws 200. The hub member is releasably retained on the stud by the head of a screw 201. The forming roll 195 has a single peripheral groove 202 to receive the wound core and may be made of fibrous material to discourage slippage of the wound wire. For actuation of the forming roll 195 a small gear 203 (Figs. 12 and 17) in mesh with the gear 196 is keyed to the end of a driven shaft 205, the shaft extending through the vertical plate 167 from gearing in a gear case 206 on the opposite side of the plate.

To press the wound core against the periphery of the forming roll 195, suitable means is provided such as a pair of circumferentially spaced pressure rolls 207 carried by studs 208 on the ends of a yoke 210. Preferably a spur gear 211 is attached face-to-face to each of the pressure rolls 207, the spur gears being in mesh with the large gear 196 to cause the two pressure rolls to be driven in a positive manner at the same peripheral speeds as the forming roll 195. The two pressure rolls 207 cooperate with the forming roll 195 in the function of gripping the wound core to draw the core through the various processing zones and in the further function of forming the wound core to the final helical configuration.

The yoke 210 is carried by a hollow pressure rod 212 that is slidingly mounted in a guide sleeve 213, the guide sleeve being integral with a small adjustable plate 215. In the construction shown the adjustable plate 215 has a pair of slots 216 engaged by screws 217, and a number of threaded bores 218 for the screws are provided in the arm 187 whereby the plate 215 may be adjusted to various positons along the length of the arm. To provide yielding pressure for urging the pressure rolls 207 against the periphery of the forming roll 195, a suitable coiled spring 220 may be confined in the hollow pressure rod 212 by a floating plunger 221 which is normally depressed by a pressure cam 222. The pressure cam 222 is journaled in an extension of the plate 215, being rotatably retained by a screw 223, and is integral with an operating handle 225. By means of the handle 225 the pressure cam may be rotated 180° between an effective position at which the two pressure rolls press against the forming roll and an ineffective position which permits the forming roll to be retracted for the threading of a wound core into the forming mechanism.

It is contemplated that the forming mechanism will include interchangeable members whereby the forming mechanism may be adapted to the forming of helixes of various diameters. Fig. 18, by way of example, shows a combined gear and forming roll 226 substituted for the forming roll 195 and the associated gear 196, the purpose of the substitution being to adapt the apparatus for the production of resistant elements of smaller diameter. The change to the smaller diameter also requires lowering of the arm 187 and the substitution of a new yoke assembly. To provide for lowering the arm 187 to the new position, Fig. 17 shows the vertical plate 167 provided with a lower bore 230 to receive the bolt 188 and a second lower bore 231 to receive the previously mentioned projection 191. The substituted yoke assembly shown in Fig. 18 includes a pair of combined gears and pressure rolls 232 on a yoke 233, the yoke being carried by a relatively long hollow pressure rod 235. The pressure rod 235 extends through the guide sleeve 213 and is controlled in the previously described manner by the pressure cam 222.

The differential drive

Any type of differential driving mechanism may be employed in the preferred form of my invention that will cause the rotation of the differential motor 37 to be added algebraically to the rotation of the main motor 33 whereby the resultant speed may be varied by regulating the differential motor. In the arrangement shown, it is contemplated that the resultant rotation will be the arithmetic sum of the two motor rotations, the rotative effect of the differential motor being in the same direction as the rotation of the drive motor.

Fixedly attached to the upper end of the tubular shaft 62 in the previously mentioned gear case 38 is a disc 236 (Fig. 3) carrying planet gears 237 on studs 238. The planet gears 237 mesh with a drive gear 240 that is integral with a tubular shaft 241 and also mesh with a differential gear 242 of like diameter that is rotatably mounted on the tubular shaft 241. The drive gear 240 may have, for example, one more tooth than the differential gear 242, so that one revolution of the disc 236 causes the gear 240 to advance one tooth when the gear 242 is stationary. Integral with the differential gear 242 is a worm gear 243 in mesh with a worm 245 that is on the inner end of a horizontal shaft 246. The horizontal shaft 246 extends to the outside of the gear case 38 and carries at its outer end a worm gear 247 (Fig. 1). The differential motor 37 which is supported by a standard 248 has a downwardly extending motor shaft 250 to which is keyed a worm 251 in mesh with the worm gear 247. Preferably the motor shaft 250 also carries a small fly-wheel 252.

It is apparent that the rate at which the short tubular drive shaft 241 is rotated by the drive wheel 240 depends both upon the rate of travel of the two planet gears 237 about the axis of the tubular shaft and upon the rate of rotation of the differential gear 242. The train of mechanism for power transmission to the final forming mechanism 32 includes the following: a spur gear 255 on the upper end of the tubular shaft 241 (Fig. 3); two intermeshed gears 256 (Fig. 2) mounted on a bracket 257; the previously mentioned vertical shaft 40; a helical gear 258 (Fig. 12) on the upper end of the shaft 40; a second helical gear 260 on the end of a stub shaft 261 that extends into the gear case 206; an inner gear 262 keyed to the stub shaft inside the gear case; a fixed ring gear 263; a disc 265 in the gear case keyed to the inner end of the previously mentioned shaft 205; and a plurality of planet gears 266 carried by studs 267 on the disc 265, the planet gears being in mesh both with the inner gear 262 and the outer fixed ring gear 263.

The electrical arrangement

Figure 20:
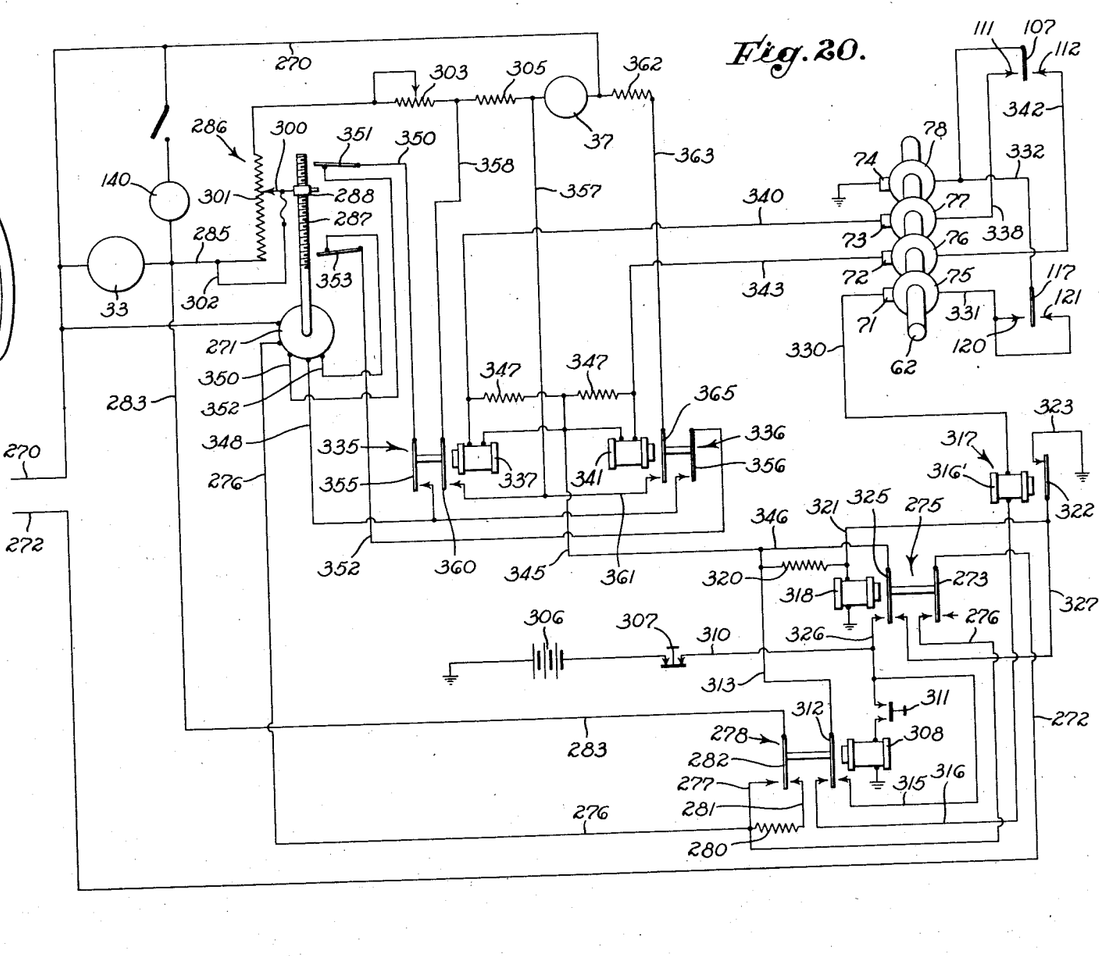
Fig. 20 is a wiring diagram of an electrical arrangement that may be incorporated in the apparatus.

The wiring diagram depicted in Fig. 20 is to be regarded as illustrative only, since numerous electrical arrangements may be designed for controlling the described apparatus. In the motor circuits one power lead 270 is connected to the main drive motor 33, the differential motor 37, the motor 140 that drives the brush 155, and an adjustment motor 271 that is concealed in the previously mentioned control cabinet 41. The other power lead 272 is connected to a contactor switch 273 of a circuit-breaker relay generally designated 275. In response to energization of the circuit-breaker relay 275 the contactor switch 273 moves from an ineffective position to a position establishing contact with a switch element connected to a wire 276 that leads to a second terminal of the adjustment motor 271. Connected to the wire 276 is a branch wire 277 extending to a contact of a starting relay generally designated 278, and also connected to the wire 276 is a resistance 280 providing a wire 281 for connection with a complementary contact in the starting relay 278, the two contacts being cooperative with a contactor switch arm 282. A wire 283 from the contactor switch arm 282 is connected to the main motor 33 and to the brush motor 140 to complete motor circuits and is also connected by a wire 285 to an adjustable rheostat generally designated 286 that is in the circuit for energizing the differential motor 37.

The adjustable rheostat 286 is mechanically controlled by the adjustment motor 271, the schematic arrangement in the wiring diagram showing a worm 287 driven by the adjustment motor, a traveling nut 288 on the worm, and a rheostat contact 300 carried by the worm to traverse a resistance 301. This contact 300 is connected to the wire 285 by a wire 302 acting to short-circuit the current around the lower portion of the resistance 301. In series with the rheostat 286 in the circuit through the differential motor 37 are a manually adjustable rheostat 303 and a fixed resistance 305.

The various control circuits employed in the apparatus are energized by a battery 306, one terminal of which is grounded, the other terminal being in series with a normally-closed, manually-operative stop switch 307. The control circuit through a coil 308 of the starting relay 278 is completed by a wire 310 from the stop switch 307, the wire being broken by a normally open, manually-operative starting switch 311. In addition to the contactor switch 282 for the motor circuit, the starting relay 278 has a contactor switch 312 for the lower voltage control circuits, the arm of this contactor switch 312 being connected to a wire 313. When the coil 308 of the relay 278 is energized, the arm of the contactor switch 312 engages a contact connected to a wire 315 that is connected to the wire 310 between the stop switch 307 and the starting switch 311. When the starting relay is deenergized, the arm of the contactor switch 312 engages a contact connected to a wire 316 leading to one terminal of the control winding 316' of an emergency control relay 317.

The circuit-breaker relay 275 provides a coil 318, one terminal of which is grounded. The other terminal is connected to the wire 313 through a resistance 320 and is connected by a wire 321 of the arm of a contactor switch 322 forming a part of the emergency control relay 317. So long as the winding 316' of the emergency control relay 317 is energized, the arm of the contactor switch 322 presses against a contact connected to a grounded wire 323. In addition to the contactor switch 273, the circuit-breaker relay 275 has a second contactor switch 325, the arm of which in the energized position of the relay engages a contact connected to the wire 310 through a wire 326 and, in the deenergized position of the relay, engages another contact connected through a wire 327 to the arm of the contactor switch 322 of the emergency control relay.

The circuit through the coil 316' of the emergency control relay 317 includes also a wire 330, the previously mentioned brush 71 and ring 75 on the winding mechanism 26 and a wire 331 that leads to both of the stationary contacts 120 and 121 associated with the switch arm 117 of the previously mentioned emergency control lever 102. The switch arm 117 is connected to a wire 332 which extends to the ring 78, the corresponding brush 74 being grounded as indicated.

The diagram also shows the switch arm 107 of the previously mentioned normal control lever 101, this switch arm being connected to the wire 332 and thus to the ring 78 and to ground. Likewise, this diagram shows the two stationary contacts 111 and 112 that cooperate with the switch arms. Associated with the contacts 111 and 112 are respectively an acceleration relay generally designated 335 and a retarding relay generally designated 336. The contact 111 is in circuit with an operating coil 337 of the accelerating relay through a wire 338, the ring 77, the brush 73, and a wire 340. In like manner the contact 112 is in circuit with an operating coil 341 of the retarding relay through a wire 342, ring 76, brush 72, and a wire 343. The circuits through the two coils 337 and 341 are completed by a wire 345 that is connected both to the previously mentioned wire 313 and to a wire 346 leading to the arm of the contactor switch 325 of the circuit breaker relay. Each of the two coils 337 and 341 is shunted by a suitable fixed resistance 347.

One function of the accelerating and retarding relays 335 and 336 is to control the adjustable rheostat 286 through the medium of the adjustment motor 271 in response to movements of the normal control lever 101 in the winding mechanism. Any suitable reversible motor may serve as the adjustment motor 271. The particular adjustment motor 271 indicated in the drawings is a shaded pole motor and is reversible by virtue of circuits which short-circuit one or the other of its shading windings. Both of the shading winding circuits of the adjustment motor 271 have a common wire 348 and one of the shading circuits includes a wire 350 in which is placed a limit switch 351 while the other shading circuit includes a wire 352 in which is placed a limit switch 353. The two limit switches are adapted for operation by the traveling nut 288.

When the accelerating relay 335 is energized by action of the normal control lever 101, a contactor switch 355 connects the wire 348 with the wire 350 to drive the motor 271 in a direction to reduce the resistance offered by the rheostat 286 in the circuit of the differential motor 37; on the other hand, when the retarding relay 336 is energized by the normal control lever, a contactor switch 356 connects the wire 348 with the wire 352 to drive the adjustment motor 271 in the opposite direction for the purpose of increasing the resistance through the rheostat 286 thereby to reduce the speed of the differential motor 37.

The accelerating and retarding relays 335 and 336 need have no additional function for the practice of my invention, but I prefer to employ them for the further purpose of momentarily reducing or increasing current flow through the differential motor 37 whenever the normal control lever 101 moves the switch arm 107 to one of its limit positions. The accelerating relay 335 is adapted when energized to shunt the fixed resistance 305 in the differential motor circuit, thereby to increase the current through the differential motor. The required shunt circuit includes a wire 357 from one side of the resistance 305, a wire 358 from the other side of the resistance and a contactor switch 360 associated with the accelerating relay 335 so that the shunt circuit is closed whenever the relay is energized.

For the purpose of temporarily reducing current through the differential motor 37 in response to energization of the retarding relay 336 I provide another shunt circuit. One side of this second shunt circuit includes the wire 357 and a wire 361 extending to a contact in the retarding relay. The other side of the shunt circuit includes a resistance 362, a wire 363 and the arm of a contactor switch 365 forming a part of the retarding relay that engages the contact to close the circuit when the relay is energized.

Operation of the apparatus

In setting up the apparatus for operation, first a spool of the insulated conductor 20 is installed in the winding frame. Then the wire for the core 21 is threaded through the various parts of the apparatus including the feed rolls, the coating receptacle, the winding mechanisms, the guide tube associated with the abrading brush, and the forming mechanism at the top apparatus. The insulated conductor 20 is then led to the winding station where a few turns are made on the core 21 by hand. The operator then closes the starting switch 311 and holds the switch closed until normal operation is attained, the operator in the meantime manipulating the adjustable rheostat 303 as may be required to cause the normal control lever to hover in the desired normal range of feed angles.

The energization of the starting relay 278 by the starting switch 311 causes the contactor switch 282 to interconnect wires 276 and 283 in the motor circuit through the resistance 280 and simultaneously causes the contactor switch 312 to connect the wire 313 with the wire 315, the effect of the latter action being energization of the circuit-breaker relay 275 through wire 346, contact arm 325, wire 327, and wire 321. When the circuit-breaker relay is energized, the contactor switch 273 completes the motor circuit by connecting the wire 272 to the wire 276. Simultaneously the contactor switch 325 electrically interconnects the wires 326 and 346 to keep the circuit-breaker relay energized by the battery 306. When the operator releases the starting switch 311 to deenergize the starting relay 278, the contactor switch 282 moves to its alternate position at which it still maintains the motor circuit (except that the resistance 280 is removed therefrom), and the contactor switch 312 shifts to its alternate position connecting the wire 313 to the wire 316. This latter action causes control of the motor circuits to be transferred from the starting switch 311 to the emergency control relay 317, the energization of which is in turn controlled by the emergency control lever 102, such energization closing the contactor switch 322 and thus by-passing to ground the energizing current otherwise flowing to the winding 318 of the circuit breaker relay 275 through the resistor 320.

Whenever the winding-feed angle increases sufficiently to cause the switch arm 107 to swing against the contact 111 the accelerating relay 335 is energized to temporarily shunt the resistance 305 and simultaneously to adjust the rheostat 286 in the direction of increased current flow. On the other hand, whenever the change in the winding-feed angle swings the switch arm 107 against the contact 112, the retarding relay 336 is energized to adjust the rheostat 286 in the direction of decreased current flow, the relay simultaneously shunting current around the differential motor through the resistance 362. It is apparent that the shunt circuits involving the resistances 305 and 362 serve to momentarily accelerate or retard the differential motor as required to maintain a desired range of winding-feed angles and that each act of accelerating or retarding the motor is accompanied by an adjustment of the motor circuit that tends to correct the motor speed.

Whenever the insulated conductor 20 breaks and whenever the winding-feed angle shifts beyond the desired range of angles in either direction, the switch arm 117 of the emergency control lever 102 touches one of the contacts 120 and 121 to energize the emergency control relay 317 thereby moving the contactor switch 322 to its circuit-closing position. As a result, the circuit-breaker relay 275 is deenergized by short-circuiting of the coil 318. Deenergization of the circuit-breaker relay causes the contactor switch 273 to break the motor circuit and simultaneously causes the contactor switch 325 to shift from a connection with the wire 310 to a connection with the wire 327.

As the wound core on the forming roll 195 is formed into successive turns about the forming roll, the successive turns are crowded longitudinally off the roll onto any suitable receiving means and the coiled product is later cut to desired lengths.

The preferred form of my invention, which has been described in detail herein for the purpose of disclosure and to illustrate the underlying principles, includes dispensable refinements and will suggest to those skilled in the art various changes and substitutions under my concept; I reserve the right to all such departures that properly come within the scope of my appended claims.

I claim as my invention:

1. An apparatus of the character described for winding a flexible member onto an elongated core, said apparatus including: means to feed said flexible member to the periphery of said core, driving means to rotate relatively said feeding means and said core; driving means to move said core longitudinally past said feeding means; and means responsive to changes in the angle of feed of said flexible member to regulate the speed of one of said driving means thereby to keep the feeding angle within a desired range.

2. An apparatus of the character described for winding a flexible member onto an elongated core, said apparatus including: means to feed said flexible member to the periphery of said core; driving means to rotate said feeding means about said core; driving means to move said core longitudinally past said feeding means; and means responsive to changes in the angle of feed of said flexible member to stop both said driving means whenever the angle of feed departs from a predetermined range of angles.

3. An apparatus of the character described for winding a flexible member onto an elongated core, said apparatus including: a first means to move said core longitudinally through a winding station; a second means to feed said flexible member to the periphery of said core helically at said winding station; a primary actuator to drive one of said two means; a differential actuator cooperative with said primary actuator to drive the other of said two means at a resultant rate; and means responsive to changes in the angle of feed of said flexible member at said winding station to regulate said differential actuator and thereby regulate the relative speed of said two means.

4. An apparatus of the character described for winding a flexible member onto an elongated core, said apparatus including: a first means to move said core longitudinally through a winding station; a second means to feed said flexible member to the periphery of said core helically at said winding station; a primary actuator to drive one of said two means; a motor cooperative with said primary actuator to drive the other of said two means at a resultant speed; adjustable means to regulate the driving effect of said motor on said other of said two means; means responsive to the angle of feed of said flexible member to automatically vary the setting of said adjustable means; means to increase the energizing current through said motor temporarily in response to change of said angle of feed to a predetermined limit in one direction; and means to decrease the energizing current through said motor temporarily in response to change of said angle of feed to a predetermined limit in the other direction.

5. An apparatus of the character described for winding a flexible member onto an elongated core, said apparatus including: a first means to move said core longitudinally through a winding station; a second means to feed said flexible member to the periphery of said core helically at said winding station; a primary actuator to drive one of said two means; a motor cooperative with said primary actuator to drive the other of said two means at a resultant speed; a circuit for energizing said motor; a first means to change the resistance in said circuit in response to changes in the feed angle of said flexible member at said winding station to increase the current through said motor when said angle reaches one limit of a range of angles; and a second means to change the resistance in said circuit in response to changes in the feed angle of said flexible member to decrease the current through said motor when said angle reaches the other limit of said range of angles.

6. An apparatus of the character described for winding a flexible member onto an elongated core, said apparatus including: means to feed said flexible member to the periphery of said core; driving means to rotate relatively said feeding means and said core; driving means to move said core longitudinally past said feeding means; means to regulate the speed of one of said driving means; a first control circuit operatively associated with said regulating means to increase said speed; a second control circuit operatively associated with said regulating means to decrease said speed; and means responsive to changes in the angle of feed of said flexible member to close said first circuit when said angle reaches one limit of a range of angles and to close said second circuit when said angle reaches the opposite limit of the range of angles.

7. An apparatus of the character described for winding a flexible member onto an elongated core, said apparatus including: a spool wound with said flexible member; a rotary support carrying said spool, said spool and support having an axial passage; a first driving means to draw said core longitudinally through said passage; a second driving means to rotate said support; means carried by said support to feed said flexible member to the periphery of said core in such manner as to wind said flexible member around said core as a plurality of helically-disposed turns in contact with each other; and means operatively connected to one of said driving means for automatically changing the speed thereof with respect to the other of said driving means in response to changes in position of the point of initial contact of said flexible member with the periphery of said core.

8. An apparatus for fabricating a resistance element having a helical winding on an elongated core, said apparatus including: a receptacle for coating material; means having an aperture dimensioned for the maximum cross-sectional dimension of the finished resistance element; guide means for said finished resistance element means to draw said core longitudinally through said receptacle to receive a coating, then through said aperture and then through said guide means; rotary means to apply said helical winding to the coated core before the core enters said aperture; and means adjacent said guide means and contacting said helical winding exclusively of one side thereof for abrading same in a longitudinally-extending path on said one side thereof.

9. An apparatus for fabricating a resistance having a partially coated helical winding on an elongated core, said apparatus including: a receptacle for coating material; means to draw said core through said receptacle to receive a coating and then longitudinally past a winding station and a coating-removal station in succession; means to supply the winding material completely coated; rotary means to apply the completely coated winding to said core at said winding station; and means on one side the path of movement of said core at said coating-removal station to remove the coating from said helical winding on one side of the wound resistance element.

10. An apparatus for fabricating a resistance having a partially coated helical winding on an elongated core, said apparatus including: a receptacle for coating material; means to draw said core through said receptacle to receive a coating and then longitudinally past a winding station and a coating-removal station in succession; means to supply the winding material completely coated; rotary means to apply the completely coated winding to said core at said winding station; abrading means on one side the path of movement of said core at said coating-removal station to remove the coating from said helical winding on one side of the wound resistance element; and means at said coating-removal station to limit lateral movement of the wound resistance away from said abrading means.

11. An apparatus for fabricating a resistance comprising a helical winding on a helical core, said apparatus comprising: means to direct the unformed core on a longitudinal path of movement; rotary means to apply said helical winding to the moving core; a rotary forming roll for the wound core, said roll being circular and providing a peripheral groove of a size to receive the wound core; and means to press the wound core onto the peripheral groove of said rotary forming roll to bend the wound core to conform to the shape of said peripheral groove along a segment of the roll periphery for the dual purpose of drawing the core along said path and of forming the wound core into the desired helix, that turn of the helix within said peripheral groove acting to crowd previously-formed turns from the end of said roll.

12. An apparatus for fabricating a resistance having a partially coated helical winding on a helical core, said apparatus including: means to direct the unformed core on a longitudinal path of movement; means to supply completely coated winding material; rotary means to apply said winding material in a helix to the periphery of the moving unformed core; means on one side the path of movement of said unformed core to remove the coating from said helical winding on one side after the winding is applied to the core; a rotary forming means for the wound core having a cylindrical surface; and means to press the wound core onto the cylindrical surface of said rotary means for the dual purpose of drawing the core along said path and of forming the wound core into the desired helix.

13. An apparatus for fabricating a resistance having a helical winding on an elongated core, said apparatus including: rotary means to grip and move longitudinally the wound core thereby to move longitudinally the unwound and unformed core past a winding station; means to deposit temporarily fluid material on the moving unwound core; rotary means to feed the winding material to the periphery of the moving core at said winding station while said deposited material is on the core and before the deposited material hardens; and means responsive to the winding material at the winding station to regulate the speed of one of said rotary means automatically to maintain the feeding direction of the winding material within a predetermined range of feeding directions.

14. An apparatus for fabricating a resistance having a partially coated helical winding on a helical core, said apparatus including: a rotary means to form the wound core into a helix; means to press the wound core against said rotary means thereby to draw the unformed core past a winding station and a coating-removal station in succession; means to deposit temporarily fluid material on the moving unwound core; rotary means to feed coated winding material to the periphery of the moving core at said winding station while said deposited material is on the core and before the deposited material hardens; and means on one side the path of movement of said core at said coating-removal station to remove the coating from said helical winding on one side of the wound resistance element.

15. An apparatus as set forth in claim 14 which includes means to regulate the speed of at least one of said rotary means in accordance with the rate at which the winding is applied to the core relative to the rate of core movement.

16. An apparatus of the character described for winding a flexible member onto an elongated core, said apparatus including: a first means to move said core longitudinally through a winding station; a second means to feed said flexible member to the periphery of said core helically at said winding station; a primary actuator to drive one of said two means; a differential actuator cooperative with said primary actuator to drive the other of said two means at a resultant rate; and means to regulate said differential actuator in response to changes in position relative to said winding station of the point of initial contact of said flexible member with the periphery of said core.

17. An apparatus of the character described for winding a flexible member onto an elongated core, said apparatus including: feeding means for feeding said flexible member to the periphery of said core; driving means for rotating relatively said feeding means and said core to wrap said flexible member around said core; driving means for moving said core in a longitudinal direction past said feeding means at such rate that the flexible member is wrapped helically in contacting turns about said core, said feeding means being disposed to feed said flexible member toward the periphery of said core at a slightly acute feed angle; control means responsive to a change in said feed angle; and means for operatively connecting said control means in speed-changing relationship with one of said driving means to compensate for said change in feed angle.

18. A combination as defined in claim 1 in which said means responsive to said angle of feed includes response arm means slidably engaging the flexible member as it advances toward the periphery of said core to move with changes in said angle of feed, and means for controlling the relative movement of said driving means in response to movement of said response arm means to keep the angle of feed within a predetermined range.

19. A combination as defined in claim 1 in which said means responsive to said angle of feed includes a response arm slidably engaging the flexible member as it advances toward the periphery of said core, means for movably mounting said response arm, a first circuit including a switch means operated by movement of said response arm in one direction to modify the speed of one of said driving means, and a second circuit including a switch means operated by movement of said response arm in another direction to modify oppositely the speed of said one of said driving means.

20. A combination as defined in claim 1 in which said means responsive to changes in the angle of feed of said flexible member includes additional means to stop both said driving means whenever the angle of feed departs from said desired range.

21. A combination as defined in claim 1 in which said means responsive to said angle of feed includes response arm means slidably engaging the flexible member as it advances toward the periphery of said core to move with changes in said angle of feed, means for controlling the relative movement of said driving means in response to movement of said response arm means to keep the angle of feed within a predetermined range, and means responsive to breakage of said flexible member and to deviations of said angle of feed from said predetermined range.

22. An apparatus for fabricating an element comprising a flexible member wound helically around an elongated core, said apparatus including: a receptacle for coating material; means for drawing said core through said receptacle to receive a coating of said coating material and then longitudinally past a winding station and an abrading station in succession; means for winding said flexible member helically around said core at said winding station to produce a wound-core element; and abrading means on one side of the path of movement of said wound-core element at said abrading station for abrading said wound-core element in a longitudinally-extending path on said one side thereof.

23. An apparatus for fabricating an element comprising a flexible member wound helically around an elongated core, said apparatus including: a receptacle for coating material; means for drawing said core through said receptacle to receive a coating of said coating material and then longitudinally past a winding station and an abrading station in succession; means for winding said flexible member helically around said core at said winding station to produce a wound-core element; abrading means on one side of the path of movement of said wound-core element at said abrading station for abrading said wound-core element in a longitudinally-extending path on said one side thereof; and means for bending said wound-core element into the form of a helix with the abraded path facing radially with respect to the central axis of the helix.

DOUGLAS GEORGE MARLOW.